(12) United States Patent
Le Pennec et al.

(10) Patent No.: US 8,732,297 B2
(45) Date of Patent: May 20, 2014

(54) TIME-BASED GRAPHIC NETWORK REPORTING NAVIGATOR

(75) Inventors: Jean-Francois Le Pennec, Nice (FR); Jacques Fieschi, Valbonne (FR); Marc Gatignol, Valbonne (FR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 989 days.

(21) Appl. No.: 12/613,707

(22) Filed: Nov. 6, 2009

(65) Prior Publication Data
US 2011/0072353 A1  Mar. 24, 2011

(30) Foreign Application Priority Data

Sep. 21, 2009 (FR) .................................. 09 56459

(51) Int. Cl.
*G06F 15/173* (2006.01)
*H04L 12/24* (2006.01)

(52) U.S. Cl.
CPC ........... *H04L 41/0622* (2013.01); *H04L 41/064* (2013.01)
USPC .......................................... 709/224; 709/223

(58) Field of Classification Search
CPC ...................... H04L 41/0622; H04L 41/064
USPC .................................................. 708/223, 224
See application file for complete search history.

(56) References Cited

U.S. PATENT DOCUMENTS

| | | | |
|---|---|---|---|
| 5,615,323 A | 3/1997 | Engel et al. | |
| 5,867,483 A * | 2/1999 | Ennis et al. | 370/252 |
| 6,438,110 B1 * | 8/2002 | Rai et al. | 370/254 |
| 6,453,346 B1 * | 9/2002 | Garg et al. | 709/224 |
| 6,684,247 B1 * | 1/2004 | Santos et al. | 709/224 |
| 6,854,091 B1 | 2/2005 | Beaudoin | |
| 7,373,403 B2 * | 5/2008 | Kroboth et al. | 709/224 |
| 7,499,994 B2 * | 3/2009 | Sapiro et al. | 709/224 |
| 7,565,610 B2 * | 7/2009 | Li et al. | 715/736 |
| 7,808,903 B2 * | 10/2010 | Krishnaswamy et al. | 370/232 |
| 7,855,978 B2 * | 12/2010 | Beaudoin | 370/254 |
| 8,064,364 B2 * | 11/2011 | Marshall | 370/254 |
| 8,274,905 B2 * | 9/2012 | Edwards et al. | 370/252 |
| 2002/0095493 A1 * | 7/2002 | Byrnes | 709/224 |
| 2003/0225876 A1 | 12/2003 | Oliver et al. | |
| 2004/0061701 A1 * | 4/2004 | Arquie et al. | 345/440 |
| 2005/0114795 A1 * | 5/2005 | Beaudoin | 715/854 |
| 2005/0219151 A1 * | 10/2005 | Li et al. | 345/7 |
| 2006/0026275 A1 * | 2/2006 | Gilmour et al. | 709/223 |

FOREIGN PATENT DOCUMENTS

| | | |
|---|---|---|
| WO | 98/21845 A1 | 5/1998 |
| WO | 2004/032427 A1 | 4/2004 |

\* cited by examiner

*Primary Examiner* — Hieu Hoang

(74) *Attorney, Agent, or Firm* — Hoffmann & Baron, LLP

(57) ABSTRACT

The presently disclosed embodiments are directed to representing network performance information using a network map by partitioning a graphical affordance representing a network element in the network map into segmented sections in accordance with a temporal encoding scheme to encode temporal information in the network map. The segmented sections are encoded using a performance encoding scheme to identify a level of performance associated with the segmented sections so that the network map depicts a performance of the network element over time.

20 Claims, 4 Drawing Sheets

TIME-BASED GRAPHIC NETWORK REPORTING NAVIGATOR

CROSS REFERENCE TO RELATED APPLICATIONS

This application claims priority to French Patent Application No. 0956459, filed on Sep. 21, 2009, the entirety of which is incorporated herein by reference.

BACKGROUND

1. Field of Technology

The presently disclosed embodiments are directed to encoding network maps with temporal network status information.

2. Brief Discussion of Related Art

Network management tools typically provide fault management, which is generally shown graphically on a network map or topological view. The map or topology view can include boxes and lines, where the boxes represent network devices and the lines represent network links or connections between devices. The maps or topology views can assign a single color to the boxes and lines to identify a single status, such as a current status or possibly the highest status previously achieved by the boxes and links. For example, the color green may be used to indicate a good state and the color red may be used to indicate a bad state.

For performance management, the topological views representing the performance of devices and links or sub-entities are often not implemented. If such views are available, it typically only provides an entry point to separate graphs that can be displayed showing, for example, traffic information with the time as one coordinate axis and a traffic parameter as another coordinate axis. Using this conventional approach, the user typically has to perform a step-by-step investigation from traffic graphs to text graphs showing the performance numbers. This approach is typically time consuming, error prone, inefficient, and burdensome for users that wish to find and extract relevant information from these graphs.

SUMMARY

Embodiments disclosed herein are directed to a method, computer-readable medium, and system for representing network performance information using a network map generated by a performance management tool implemented using at least one computing device. A graphical affordance representing a network element in the network map is partitioned into segmented sections in accordance with a temporal encoding scheme to encode temporal information in the network map. The segmented sections are encoded using a performance encoding scheme to identify a level of performance associated with the segmented sections. The network map depicts a performance of the network element over time.

A length of the segmented sections can be proportional to a length of time for which the network performance information remains within a predefined range associated with the performance encoding scheme. In some embodiments, the length of the segmented sections is identical to indicate that each of the segmented sections represents an identical amount of time. In some embodiments, the segmented sections can be grouped according to performance identifiers associated with the segmented sections so that segmented sections having a common performance identifier are arranged adjacently to illustrate an amount of time for which the network device remains associated with the performance identifiers in a reported time period. In some embodiments, the segmented sections according to a temporal distribution associated with the segmented sections so that the segmented sections are arranged adjacently in a sequential and consecutive manner relative to a time at which the performance information is calculated for each segmented section.

The network element can be a network link represented using two graphical affordances in the network map to illustrate bi-directional communication over the link and to report the performance level associated with each communication direction separately. Likewise, the network element can be a network node device represented using a graphical affordance, in which the segmented sections are arranged in one of a column or a row.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION

Figure 1:
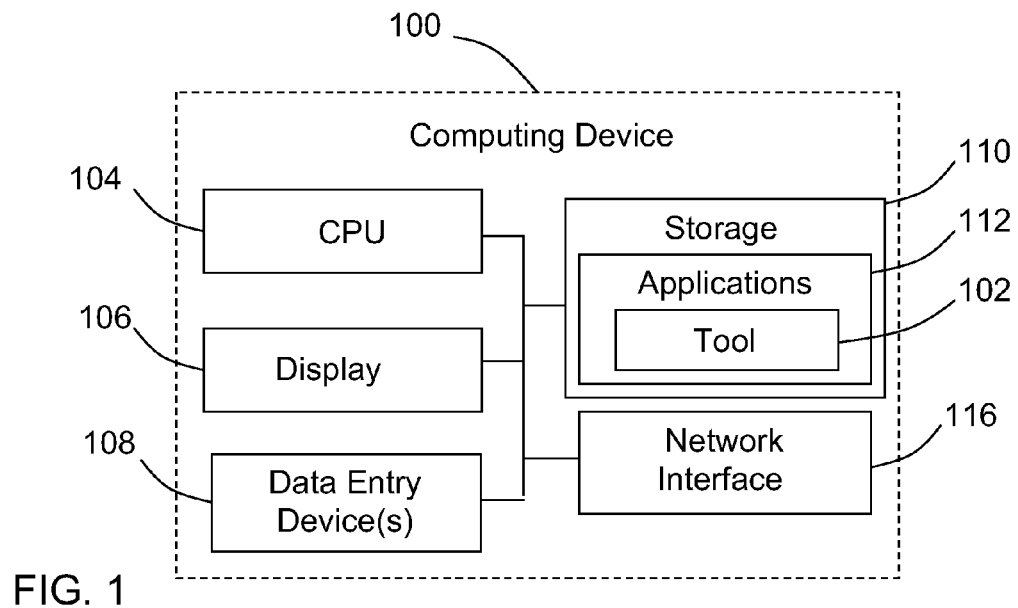
FIG. 1 is a block diagram of a computing device used to implement embodiments of the performance management tool.

The presently disclosed embodiments include reporting variable information related to networking or computing using a network map or topological view of a network. The terms "network map" and "topological view" are used interchangeably to refers to a graphical representation of a network, in which elements or components of the network, such as routers, hubs, switches, gateways, links, and the like, are represented using graphical affordances, which can be graphical objects having geometric shapes include squares, rectangles, circles, as well as lines. A performance management tool is used to generate a network map representing a network. The performance management tool encodes the network map using a performance encoding scheme and a temporal encoding scheme.

The performance encoding scheme depicts the performance of the network components or elements using performance identifiers, such as colors, patterns, shading, and so on. The temporal encoding scheme divides the graphical affordances used to represent the network elements into segments to encapsulate the performance identifiers with relation to temporal information, such as a time period being reported on the graphical affordances, a time at which the performance information is calculated, and the like. A segment or segmented section is a defined and bounded portion of a graphical affordance to partition the graphical affordance into distinct sections, which can be used to encode temporal information into the graphical affordances. The performance and temporal encoding schemes report the performance levels of the network over time. The performance encoding scheme can use performance identifiers including colors, shades of grey, hashing, and/or patterns, which can correspond to performance ranges. For example, the performance encoding scheme can associate colors with performance ranges.

The temporal encoding scheme encodes temporal information associated with performance levels in the network map of a network based on a position of temporal segments. In some embodiments, sub information, such as QoS classes of traffic may also be provided directly on the map. In some embodiments, the type of information shown on an element in the network map or network map is selectable and can be either traffic data (on the link or sub-elements within the link such as virtual circuits or classes of service), latency, jitter, packet loss, and/or the like.

Using the network map generated by the performance management tool, an enhanced user interface can be offered for performance management. The network map and interesting network information and associated temporal information allows the user to easily see and obtain the right information. As such, the performance management tool can create graphical objects in such network map representations with boxes and links with an encoded time dimension associated with network performance information reported using the generated network map. Performance information refers to performance metrics that can be calculated and/or measured in a network to identify a performance of the network. Performance metrics can include Classes of Service (CoS) and Quality of Service (QoS) metrics, such as latency, jitter, packet loss, access rate, and the like. A CoS differentiates high-priority traffic from lower-priority traffic and a QoS is used to ensure a network is meeting the requirements of a customer. The elements of the network map include information in time about the evolution of the information associated with the network elements, such as node devices and/or links.

FIG. 1 depicts an exemplary computing device 100 for implementing a performance management tool 102. The computing device 100 can be a mainframe, personal computer (PC), laptop computer, workstation, handheld device, such as a PDA, or the like. In the illustrated embodiment, the computing device 100 includes a central processing unit (CPU) 104 and preferably a display device 106. The display device 106 enables the computing device 100 to communicate directly with an operator through a visual display. The computing device 100 can further include data entry device(s) 108, such as a keyboard, touch screen, and/or mouse. The computing device 100 can include storage 110 to store data and instructions. The storage 110 can include such technologies as a floppy drive, hard drive, tape drive, Flash drive, optical drive, read only memory (ROM), random access memory (RAM), and the like. The storage 110 can include applications 112 including instructions for implementing those embodiments described herein.

Storage 110 can be local or remote to the computing device 100. The computing device 100 preferably includes a network interface 116 for communicating with the network for which a network map encoding performance information associated with the network is to be generated. The CPU 104 executes the applications 112 in storage 110 by performing instructions therein and storing data resulting from the performed instructions, which may be presented to a user via the display 106 or by other mechanisms known to those skilled in the art, such as via a printer. The data can include a value for one or more reliability metrics representing network, service, path, and/or element reliability.

The performance management tool 102 can generate a network map of a network and can encode the network map using a performance encoding scheme and a temporal encoding scheme, as discussed above. The performance management tool 102 can interact with the network to calculate performance metrics to be reported with the generated network map and can be scheduled to calculate the performance metrics at a fixed time interval or at an arbitrary time interval. The performance metrics calculated by the performance management tool 102 at the intervals are encoded into the network map for display.

Figure 2:
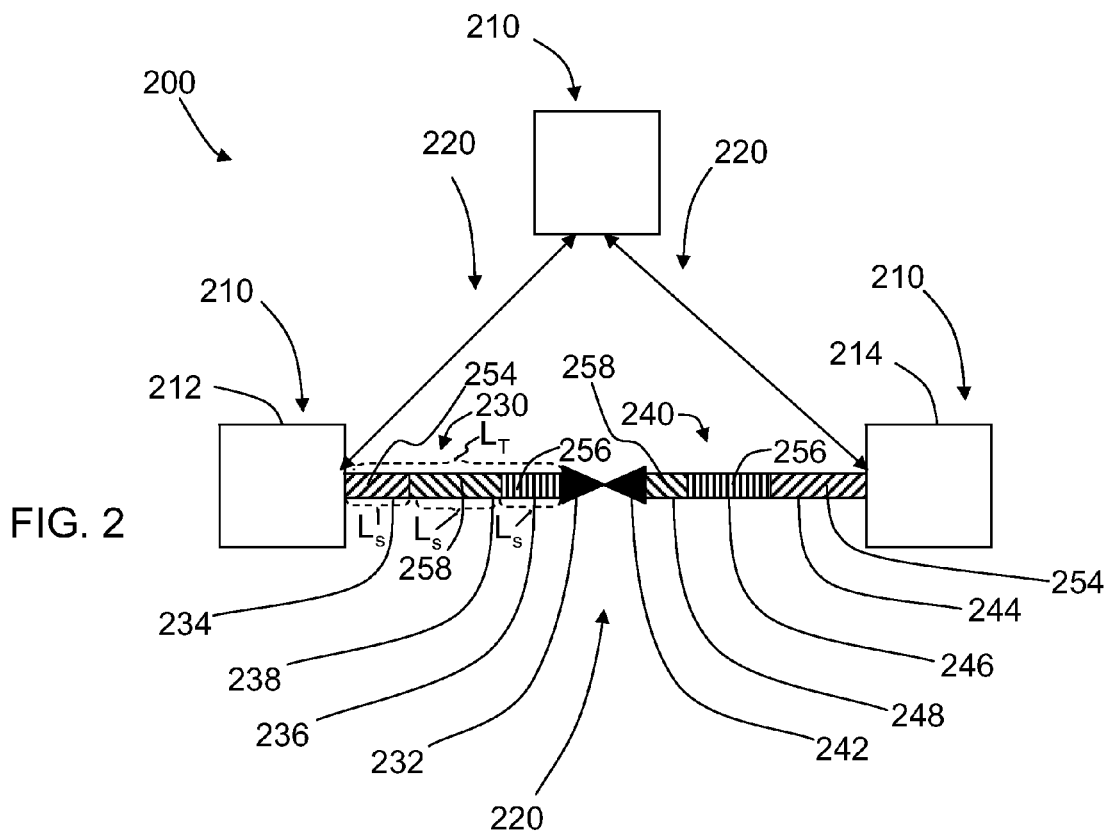
FIG. 2 is a network map implemented using an embodiment of a performance management tool to encode performance information associated with the network over time.

FIG. 2 shows a portion of a network map 200 of a communication network that can be generated using a performance management tool. The network map 200 can be implemented using an image format, such as a scalable vector graphics (SVG) format, a Graphics Interchange Format (GIF), and so on. The network map 200 can be interactive to allow the user to manipulate the topology view 200, for example, by allowing the user click on items in predefined pathways or dynamically generated network maps for further information.

The SVG format is an open, Hypertext Transfer Protocol (HTTP) compatible standard that allows fully interactive mapping applications, without the need for applets or a round trip to the server every time the map presentation is modified. The SVG format is implemented in an XML language for describing two-dimensional graphics and allows for three types of graphic objects including vector graphic shapes (e.g., circles, rectangles, and paths consisting of straight lines and curves); images; and text. These graphical objects can be grouped, styled, transformed, and incorporated into previously rendered objects. The display and manipulation features of the SVG format can include nested transformations, clipping paths, alpha masks, filter effects, and template objects.

For embodiments implemented using the SVG format, the SVG format of the network map can be implemented to allow the user to click on items in predefined pathways or dynamically generated network maps for further information, zoom-in on element(s) in the network map, zoom-out to view a larger area of the network map, pan across the network map, drill down into different views associated with the network map, select various elements, and so on. Using the SVG format to represent the network map enhances navigation of the network map and renders large and complex networks in a manageable form. The SVG format brings rich, compelling, interactive, high-resolution graphics to applications and networks.

SVG-based drawings can be interactive and dynamic. For example, animations can be defined and triggered either declaratively (i.e., by embedding SVG animation elements in SVG document) or via scripting. Sophisticated client-side applications for SVG-based drawing are made possible by the use of a browser-based scripting language, such as JavaScript, which accesses the SVG Document Object Model (DOM). Using the SVG format to render network maps generates a fully interactive, browser-based mapping system. Once a network map, rendered in SVG, is downloaded to the browser, the network map can be manipulated without requiring applets or having to request a new image from the server.

SVG has many advantages over other image formats, and particularly over JPEG and GIF including the following advantages:

- Plain text format—SVG files can be read and modified by a range of tools, and are usually much smaller and more compressible than comparable JPEG or GIF images. Additionally, since it is based on XML and is entirely text-based, maps created in SVG are available for search engines to index.
- Scalable—Unlike bitmapped GIF and JPEG formats, SVG is a vector format, which means SVG images can be printed with high quality at any resolution, without the "staircase" effects seen when printing bitmapped images.
- Pan/Zoom—You can pan and zoom very quickly in an SVG image and not see any degradation of the image, and the system does not need to go back to the server for a new image.
- Searchable and selectable text—Unlike in bitmapped images, text in SVG text is selectable and searchable. For example, you can search for specific text strings, like city names in a map.
- Interaction—SVG enables dynamic and interactive graphics far more sophisticated than bitmapped solutions. Map features may be made selectable and interactive from within the browser. The user may theme a map, select objects, and manipulate layers—all without a network hop back to the server.
- Animation—SVG enables animation from within language definition itself, and through the combination of JavaScript and the SVG DOM.

The network map 200 is a graphical representation of network elements and can include boxes 210, which represent node devices in a network, such as routers, switches, gateways, hubs, terminals, and the like, and links 220, which represents connections between the node devices. In the present embodiment, network performance information is encoded into the topology view 200 to indicate a level of performance of the network elements (e.g., node devices and links) or a status of the network elements. A level of performance refers to a value associated with a performance metric, where the value is quantified with respect to a relative, absolute, or other scale, such as a percentage scale. The network performance information can be depicted on the boxes 210 or links 220 using an encoding scheme, which can associate the network performance information with performance identifiers, such as colors, shading, patterns, and so on, to identify a level of performance or a state associated with the network element on which the encoding scheme is implemented. In some embodiments, the encoding scheme can associate a range of performance levels with each performance identifier so that a particular performance identifier is used whenever the level of performance is within the corresponding range.

In the present embodiment, the link 220 is divided into two directional graphical affordances 230 and 240 to indicate a bi-directional operation of the connection represented as link 220 between the node devices represented by boxes 212 and 214. The directional graphical affordances 230 and 240 of the link 220 can include directional arrows 232 and 242. The arrow 232 is a right pointing arrow associated with graphical affordance 230, which delimitates the part of information related to the transmit data from the node device represented by box 212 to the node device represented by box 214. The arrow 242 is a left pointing arrow associated with graphical affordance 242, which delimitates the part of information related to the transmit data from the node device represented as box 214 to the node device represented as box 212.

A temporal scheme can be implemented for depicting temporal dimensions associated with the network status information being depicted in the topology view 100. The temporal scheme facilitates a presentation of the network performance information at intervals over a period of time, rather than simply reporting network status information for a discrete instance in time, such as a current level of performance or a previous level of performance associated with a network element. In the present embodiment, the temporal scheme is used to depict the network performance information of the link 120 over time by sectioning the graphical affordances 230 and 240 of the link 220 into segments, where the length $L_S$ of each of the segments can be proportional to the length of time being reported by each of the segments. In some embodiments, the segments can be equal in length to represent a fixed and equal time period for each of the segments. In some embodiments, the segments can be different lengths and can represent different lengths of time, which can correspond to, for example, a length of time the link remains in an identified performance range.

A convention can be defined such that the last reported time information (i.e., the most recently reported) is closest to the arrow 232 and the earliest reported time information (i.e., the oldest reported information) is closest to the boxes 210. For example, information being transmitted from the node device, represented as box 212, to the node device, represented as box 214, is represented by graphical affordance 230, where a segment 234 represents the earliest reported network performance information and a segment 236, being closest to the arrow 232, represents the most recently reported network performance information. In the present example, the segment 238 represents the network performance information reported at a time between the earliest and most recently reported network performance information.

In some embodiments, the segments can be arranged without regard to the relative time being report such that the order of the segments may not correspond to an order in which the level of performances occur. In such embodiments, the length $L_S$ of the segments can represent a total amount of time each performance level occurs within the total length $L_T$ of time (e.g., the one-hour period). As an example, the total length $L_T$ of each of the graphical affordances 230 and 240 of the link 220 can represent an identical one-hour period of time for which network performance information, such as an access rate, is being reported, where the average traffic being transmitted over the link is calculated every ten minutes.

In this example, with reference to graphical affordance 230, the length of the segment 234 is twenty minutes and is associated with traffic within a range 0 to 25% of the access rate that corresponds to the performance identifier 254. Thus, in the present example, the access rate was within the performance range of 0 to 25% twice during the one-hour time period. However, the identified level of performance may not have occurred consecutively in time. Rather, the identified performance level may have been separated by the occurrence of other performance levels during the one-hour period. The length of the segment 238 is thirty minutes and is associated with traffic within a range 25 to 50% of the access rate that corresponds to the performance identifier 258. The length of the segment 236 is 10 min and is associated with traffic within a range 50 to 75% of the access rate that corresponds to the performance identifier 256. The temporal scheme implemented using the segments and the encoding scheme implemented using the performance indicators depict the behavior of the link 220 over a one-hour period in the transmit direction from box 212 to box 214.

Likewise, the temporal scheme implemented using the segments and the performance encoding scheme implemented using the performance identifiers depict the behavior of the link 220 over a one-hour period in the transmit direction from the node device represented by box 214 to the node device represented by the box 212. For example, graphical affordance 240 can include segments 244, 246 and 248, which respectively represent lengths of thirty, twenty and ten minutes. Performance identifier 264 implemented for segment 244 represents traffic having an access rate within the range of 25 to 50%, performance identifier 266 implemented for segment 246 represents traffic represents traffic having an access rate of 50 to 75%, and performance identifier 268 implemented for segment 248 represents traffic having an access rate of 0 to 25%.

The time period reported using the temporal scheme can be user selectable. For example, the user can specify a one hour time period or a one day time period over which the performance information can be reported. If a one hour period is specified, for example, selection of the element in the network map, such as the link, or a button associated with the element, can allow the user to slide or scroll the display of the performance information being reported so that performance information calculated for different hours can be displayed on the network map. Similarly, when the time period being reported is a one day time period, a user can navigate between hourly performance information, daily performance information or other time periods for which performance information may be reported.

For embodiments implemented using the SVG format, each of the segments can be a vector on which operations are possible, such as a zoom-in, drilling-down to another view, searching similar states, modifying the time scale and range, and so on. For example, in some embodiments a user can select one of the segments by clicking on the segment with a mouse pointer. As a result of the selection, the performance management tool can zoom-in to a more detailed view of the selected segment. This operation is referred to herein as a "zoom-in". The more detailed view can show other information related to this link, time, and associated values. This allows users to directly reach periods of time and performance levels that are of interest to the user without having to scroll on legacy time graphs, one link after another.

Figure 3:
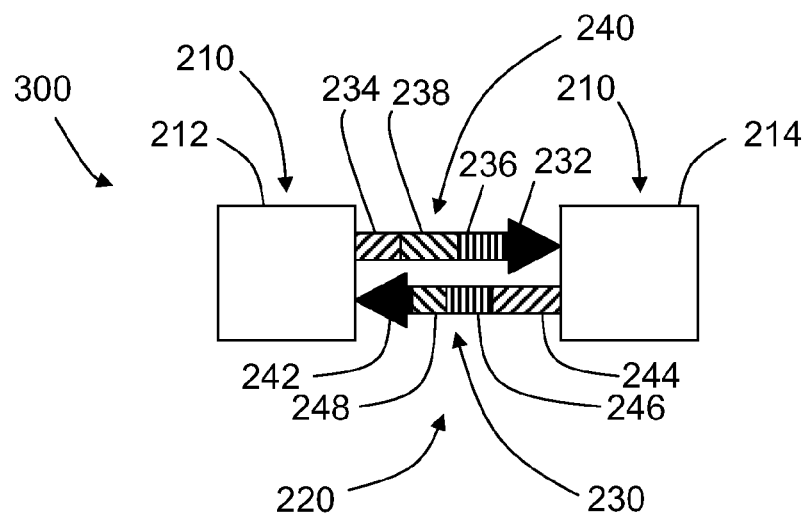
FIG. 3 is another implementation of a network map in which graphical affordances of a link are superposed.

FIG. 3 is a network map 300 that can be generated by the performance management tool. In the present embodiment, the link 120 is divided into the graphical affordances 230 and 240. The graphical affordances 230 and 240 are superposed, one for each communication direction. The graphical affordance 230 extends from the box 212 to the box 214 with the directional arrow 232 being adjacent to and pointing towards the box 214 to indicate transmission of information from the node device represented by the box 212 to the node device represented by the box 214. The graphical affordance 240 extends from the box 214 to the box 212 with the directional arrow 242 being adjacent to and pointing towards the box 212 to indicate transmission of information from the node device represented by the box 214 to the node device represented by the box 212. The segments of the graphical affordances 230 and 240 can be implemented using embodiments discussed herein.

Figure 4:
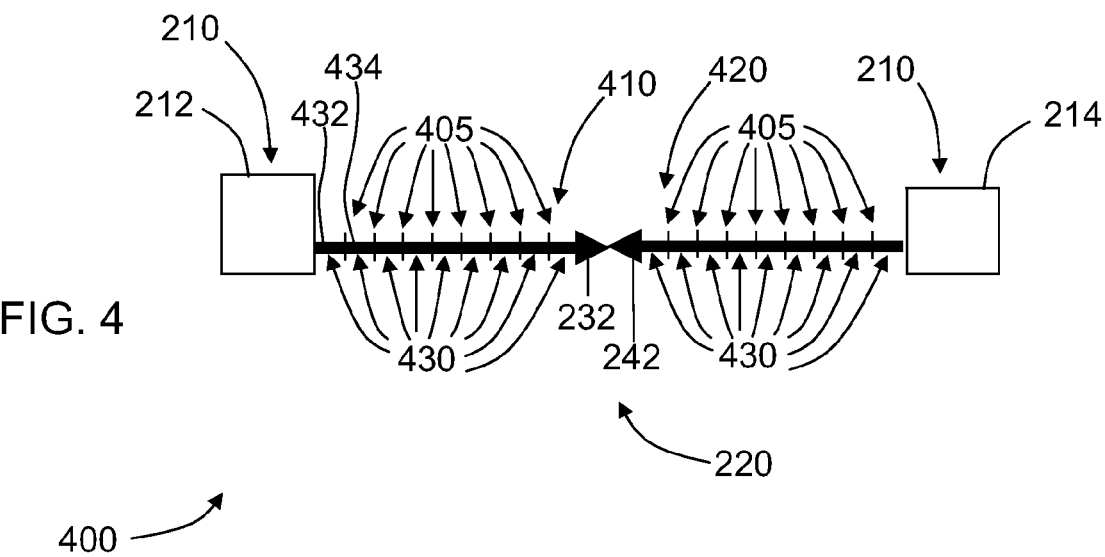
FIG. 4 is a network map representing a portion of a network and includes time markers for demarcating time slots.

FIG. 4 shows a network map 400 generated by the performance management tool that adds time markups 400 to the link 220. The link 220 can be formed from graphical affordances 410 and 420 and can include the arrows 232 and 242, respectively for indicating a direction in which information is transmitted and received over the link 220. The graphical affordances 410 and 420 can include the markups 400 to form time slots 430. In the present example, nine timeslots are created using eight markups over a one-hour time period corresponding to the length $L_T$ of the graphical affordances 410 and 420. In some embodiments, the performance levels can be grouped without regard to the relative timing of the performance levels such that the order in which the performance levels are displayed on the graphical affordances may not correspond to an order in which the level of performances occur.

It can be useful to group time slots having common performance ranges within one hour or above to get visible segments especially when the time scale (i.e., the amount of time represented by the graphical affordances, is long, such as daily or above). In the present example, there is no longer a notion of time and position of the performance identifiers. Rather, the time slots are arranged on the link to group time slots with common performance levels together. For example, performance levels calculated in timeslots 432 and 434 can have the same performance range, and therefore can be identified using the performance identifier. The time slots 432 and 434 can be consecutively and adjacently position on the graphical affordance 410 so that the time slots 432 and 434 are positioned side-by-side to group the time slots 432 and 434 together.

The time slots 432 and 434 can represent performance level calculated at non-consecutive time so that intervening and different performance levels may have occurred between the performance levels calculated for time slots 432 and 434. The time slots 432 and 434 can represent a performance level associated with a range from, for example, 0 to 25% of a performance metric. The same grouping of time slots can be performed for all other ranges of the performance metric. In the present embodiment, even if the performance value changes every 10 minutes, the graphical affordances 410 and 420 remain readable and allow the user to identify performance levels associated with the time slots 430 so that the user can identify the most common performance range, the least common performance range, a frequency of a particular performance range with the reported time period, and so on. For example, the user can identify traffic having an access rate over 75% and can determine the proportion of the traffic having an access rate of over 75% to the remaining traffic reported by the graphical affordance.

Figure 5:
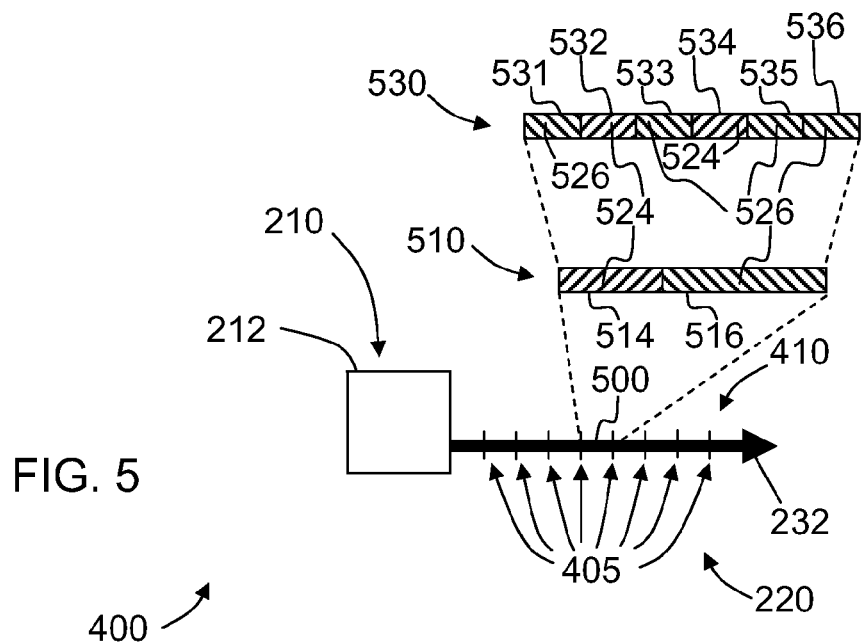
FIG. 5 illustrates a zoom-in operation that can be implemented on a network map to expand a time slot to display more detailed information.

FIG. 5 illustrates an exemplary implementation of a zoom operation on the network map 400 generated by the performance management tool. When the zoom operation is activated, a time slot can be expanded to display the performance levels occurring within the time slot with more granularity. For example, a time slot may represent performance data calculated every ten minutes over a one-hour period. In a default view, the time slot may represent an average or other combination of the data calculated at the ten minute intervals. When the zoom is implemented, each of the ten minute intervals within the one-hour period can be displayed. The ten minute intervals can be arranged relative to each other according to the time at which the interval occurred in the time slot to allow the intervals to be positioned in chronological order.

The network map 400 includes the box 212, which represents a node device in the network and the graphical affordance 410, which represents a portion of the link 220 for transmitting data from the node device represented by the box 212. The graphical affordance 410 is divided into the time slots 430 by the markups 405. In the present example, the time slots 430 can be selected by a user to, for example, zoom-in on the details of the performance metrics associated with the time slots 430. For example, the user can select a time slot 500 using the pointer of a pointing device, such as a mouse, and by clicking on the time slot 500. Upon selecting the time slot 500, an expanded time slot 510 can be displayed on the network map 400. In some embodiments, the expanded time slot 510 can replace the time slot 500 on the graphical affordance 410. In some embodiments, the expanded time slot 510 can be displayed concurrently with the time slot 500 so that the user can view both the time slot 500 and the expanded time slot 510 at the same time.

The expanded time slot 510 can provide the user with more detail as to the performance information associated with the link during the period of time reported by time slot 500. For example, the expanded time slot 510 can be parsed into segments having performance identifiers to indicate a performance level. The segments can be grouped according to the performance identifier associated with the segments so that segments having common performance identifiers are grouped together in side-by-side relation. In the present example, the expanded time slot 510 is divided into a segment 514 and a segment 516. The segment 514 is associated with a performance identifier 524 and the segment 516 is associated with a performance identifier 526.

The length of the expanded time slot 510 corresponds to the period of time represented by the time slot 500, which can be, for example, a one-hour period. In this case, the expanded time slot 510 can indicate, using the segments 514 and 516, that the performance level of the link remained within a performance range associated with the performance identifier 524 for one-third or twenty minutes of the one-hour period and that the performance level of the link remained within a performance associated with the performance identifier 526 for two-thirds or forty minutes of the one-hour period. The performance identifier 524 can be associated with a performance range of a range of 0 to 25% and the performance identifier 526 can be associated with a performance range of 25% to 50%. By grouping common performance identifiers together, the user can discern an overall breakdown in the performance of a network element, such as the link 120, without regard to the relationship between performance and time. Therefore, for example, the weekly, monthly, or yearly overall performance associated with a network element, such as a node device or link, can be given directly on the network map without additional external calculation or need to open other weekly, monthly, or yearly reports.

The user can also zoom-in to view another expanded time slot 530 by selecting the time slot 500 and/or the expanded time slot 510. The length of the expanded time slot 530 corresponds to the period of time represented by the time slot 500, which can be, for example, a one-hour period. In this case, the expanded time slot 530 can include segments 531-536 representing a time intervals for which performance data was calculated and reported. For example, the segments 531-536 can represent ten minute intervals. The segments 531-536 are in a consecutive, sequential order so that the segments are positioned according their temporal relationship. In present example, the segment 531 can represent the first time interval for which performance data was calculated and reported and the segment 536 can represent the last time interval for which performance data was calculated and reported.

Based on the expanded time slot 510, the user can discern that there were only two different performance indicators for the one-hour period associated with the time slot 500, and based on the expanded time slot 530, the user can discern the temporal distribution of the performance identifiers for the one-hour period associated with the time slot 500. In the present example, segments 531, 533, 535, and 536 can be associated with the performance identifier 526 and segments 532 and 534 can be associated with the performance identifier 524. In some embodiments, the expanded time slot 530 can replace the time slot 500 on the graphical affordance 410. In some embodiments, the expanded time slot 530 can be displayed concurrently with the time slot 500 and/or the time slot 510 so that the user can view the time slot 500 and/or the expanded time slot 510 with the expanded time slot 530 at the same time.

In some embodiments, the time slot 500 can respond to a left click on the mouse to expand the time slot 500 from the compressed view to the expanded view provided by the time slot 510 and can respond to a right click on the mouse to expand the time slot 500 from the compressed view to the expanded view provided by the expanded time slot 530. In some embodiments, the user can select the time slot 500 expanding the time slot 500 to the display the expanded time slot 510 and can select the time slot 510 to display the expanded time slot 530.

Figure 6:
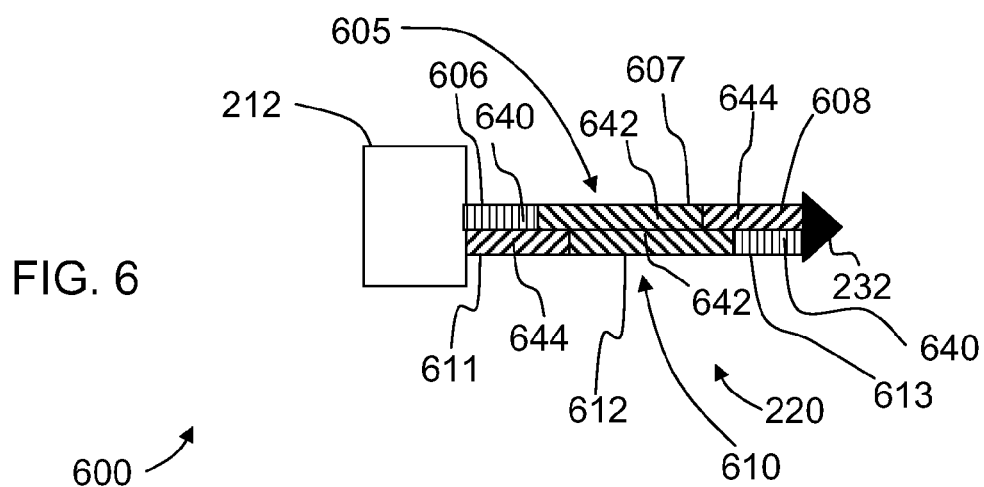
FIG. 6 illustrates reporting multiple sets of performance information for a network element in a network map

FIG. 6 illustrates a network map 600 for a portion of a network in which the node device is illustrated by the box 212 and a portion of the link 220 is illustrated by the graphical affordances 605 and 610, both of which represent the portion of the link 220 for transmitting data from the node device represented by the box 212, as indicated by the right pointing arrow 232. The graphical affordances 605 and 610 can be used to report a different performance metric, such as a Quality of Service (QoS), a Class of Service (COS), and so on, as separate sets of graphical representations. For example, the graphical affordance 605 can be used to report the a first COS associated with the link 220 in the communication direction of transmitting data from the node device represented by the box 212 and the graphical affordance 610 can represent a second COS associated with the link 220 in the communication direction of transmitting data from the node device represented by the box 212. The performance metrics reported using the graphical affordances 605 and 610 can be customized by the user to allow the user to specify which performance metrics are reported using the network map. The graphical affordances 605 and 610 can be divided into segments, which can be associated with performance identifiers. For example, the graphical affordance 605 can be divided into segments 606-608 and the graphical affordance 610 can be divided into segments 611-613. While the present example illustrates two different performance parameters being reported using the graphical affordances 605 and 610, those skilled in the art will recognize that additional performance metrics can be reported using additional graphical affordances.

In the present example, the segments 606 and 613 are associated with the performance identifier 640, the segments 607 and 612 are associated with the performance identifier 642, and the segments 608 and 611 are associated with the performance identifier 644. As such, the performance identifiers 640, 642, and 644 can be implemented independent of the underlying performance metric being reported. That is, in some embodiments, the performance identifiers simply provide a percentage range, such as 0%-25%, and any calculated performance metric falling into that range, regardless of what the performance metric is, can be identified using the performance identifier associated with the range. In some embodiments, the performance identifiers can be unique to the performance metrics such that each performance metric includes its own set of performance identifiers.

Figure 7:
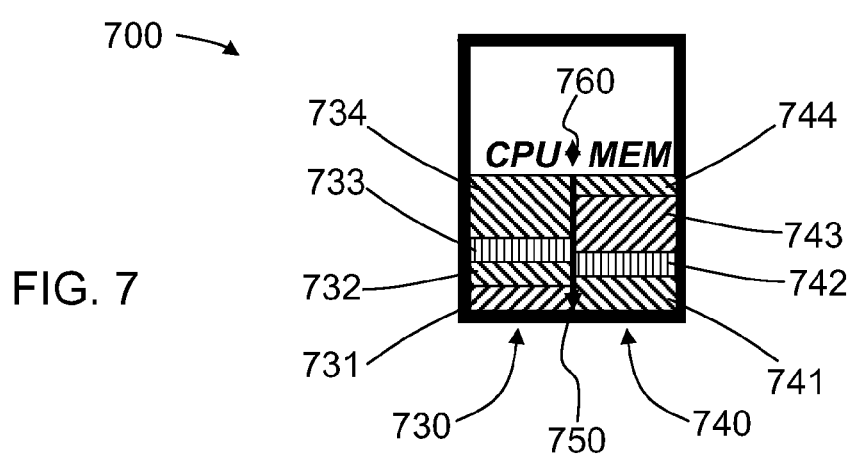
FIG. 7 is a graphical affordance of a node device in a network having performance information associated with the node device over time encoded thereon.

FIG. 7 illustrates a node device of a network represented by a box 700 in a network map. Performance metrics associated with the node device represented by the box 700 can be reported to the user using segments. The segments are disposed on the box 700 in two vertically arranged columns, where each column corresponds to a different performance metric. For example, column 730 includes segments 731-734 for reporting central processing unit (CPU) measurements associated with the node device represented by the box 700 and column 740 includes segments 741-744 for reporting memory usage associated with the node device represented by the box 700. While the segments of the present example are arranged in vertical columns, those skilled in the art will recognize that the segments can be arranged in horizontal rows.

The segments can be arranged in accordance with embodiments described herein. For example, the segments can be grouped together based on performance identifiers associated with the segments so that segments having common performance identifiers are grouped together, or the segments can be arranged relative to time so that the segments are positioned in the columns according to a temporal distribution.

For embodiments in which the segments are arranged relative to time, a direction arrow 750 can be used to indicate the time direction. For example, in the present embodiment, the direction arrow 750 can indicate that the segments 731 and 741 at the top of the columns 730 and 740 represent the earliest reported performance levels and the segments 732-734 and 742-744 below the segment 731 and 741, respectively, correspond to increasingly later reported performance levels. A scroll button 760 can be included on the box 700 to allow the user to scroll up and down in time to reveal additional segments, which may not fit in the box 700. In some embodiments, the border of the box 700 can be encoded using the performance encoding scheme. For example, a performance identifier can be disposed on the border to indicate a last performance level calculated, a highest performance level calculated, a lowest performance level calculated, and so on. In some embodiments, the ranges associated with the performance identifiers can be customized, for example, by a user. Additionally, performance ranges associated with the performance identifiers can be different for node devices and links.

Figure 8:
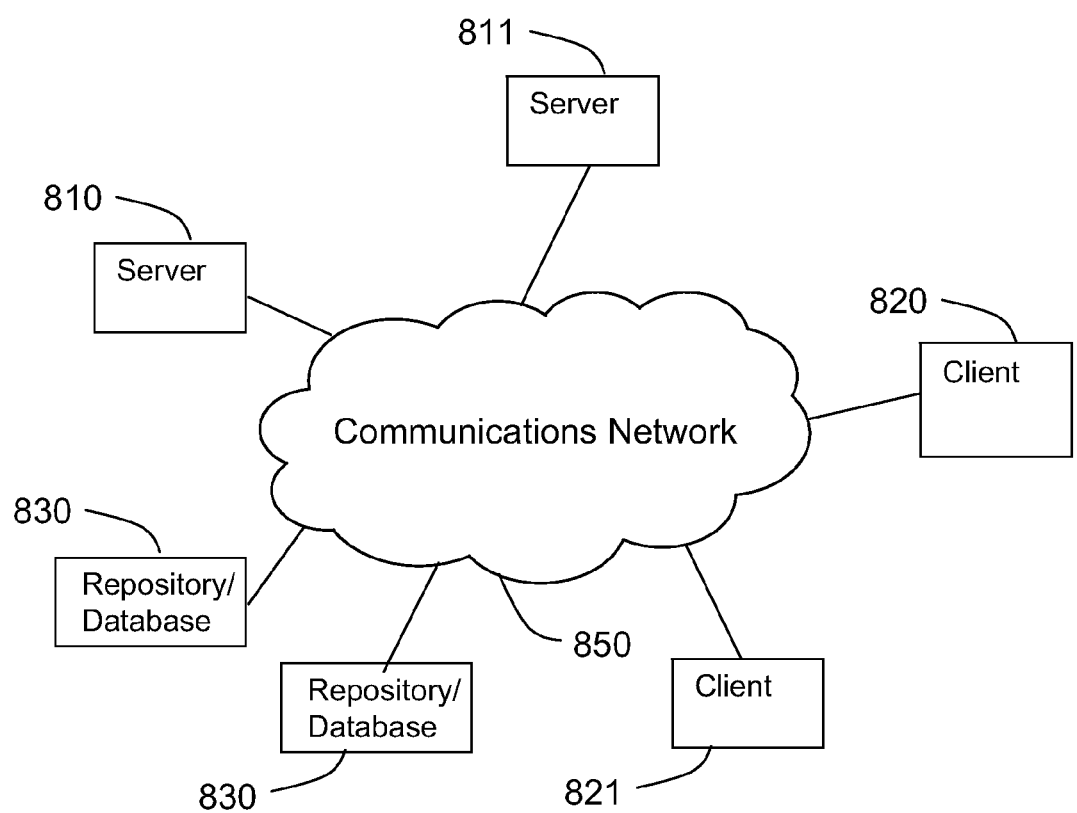
FIG. 8 is an exemplary computing system for implementing embodiments of the performance management tool.

FIG. 8 is an exemplary computing system 800 configured to implement embodiments of the tool 102 (FIG. 1). The computing system 800 includes one or more servers 810-811 coupled to clients 820-821, via a communication network 850, which can be any network over which information can be transmitted between devices communicatively coupled to the network. For example, the communication network 850 can be the Internet, Intranet, virtual private network (VPN), wide area network (WAN), local area network (LAN), and the like. The computing system 800 can include repositories or database devices 830 (hereinafter "database devices 830"), which can be coupled to the servers 810-811, as well as to clients 820-821, via the communications network 850. The servers 810-811, clients 820-821, and database devices 830 can be implemented using computing devices.

The servers 810-811, clients 820-821, and/or repository devices 830 can store information, such as network performance information over time, the temporal encoding scheme, the performance encoding scheme including performance identifiers, network maps, performance ranges associated with the performance identifiers, and the like. In some embodiments, the implementation of the tool 102 can be distributed among the servers 810-811, clients 820-821, and/ or database devices 830 such that one or more components of the tool 102, or portions thereof, can be implemented by a different device (e.g. clients, servers, databases) in the communication network 850.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

The invention claimed is:

1. A method of representing network performance information using a network map comprising:
   accessing, using a processing device, a network map representing a network, the network comprising a plurality of network elements, the plurality of network elements comprising a plurality of node devices and a network link between first and second node devices of the plurality of node devices, the network map comprising a plurality of graphical affordances that graphically represent the plurality of network elements;
   partitioning, using the processing device, a graphical affordance of the plurality of graphical affordances that is associated with a network element of the plurality of network elements into segmented sections in accordance with a temporal encoding scheme that encodes temporal information in the network map; and
   encoding, using the processing device, the segmented sections using a performance encoding scheme that identifies a level of performance associated with the segmented sections, the partitioned and encoded graphical affordance being included in the network map and representing a performance of the network element as a function of time for a period of time.

2. The method of claim 1, further comprising specifying a length of the segmented sections to be proportional to a length of time for which the network performance information remains within a predefined range associated with the performance encoding scheme.

3. The method of the claim 1, further comprising specifying a length of the segmented sections to be identical to indicate that each of the segmented sections represents an identical amount of time.

4. The method of claim 1, further comprising grouping the segmented sections according to performance identifiers associated with the segmented sections so that segmented sections having a common performance identifier are arranged adjacently to illustrate an amount of time for which the network device remains associated with the performance identifiers in a reported time period.

5. The method of claim 1, further comprising positioning the segmented sections according to a temporal distribution associated with the segmented sections so that the segmented sections are arranged adjacently in a sequential and consecutive manner relative to a time at which the performance information is calculated for each segmented section.

6. The method of claim 1, wherein the network element is the network link, and the method further comprises representing the network link using two graphical affordances that graphically indicate bi-directional communication over the link and graphically indicate the performance level associated with each communication direction separately.

7. The method of claim 1, wherein the network element is a node device of the plurality of node devices, and the method further comprises representing the node device using a graphical affordance of the plurality of graphical affordances that is shaped as a polygon, and arranging its segmented sections in one of a column or a row.

8. A tangible computer readable storage device storing instructions that, when executed using a processing device, perform operations comprising:

accessing a network map representing a network, the network comprising a plurality of network elements, the plurality of network elements comprising a plurality of node devices and a network link between first and second node devices of the plurality of node devices, the network map comprising a plurality of graphical affordances that graphically represent the plurality of node devices and the network link, wherein the first and second node devices are represented by first and second polygonal graphical affordances of the plurality of graphical affordances, and the network link is represented by a graphical affordance of the plurality of graphical affordances that extends between the first and second graphical affordances;

partitioning a graphical affordance of the plurality of graphical affordances that is associated with a network element of the plurality of network elements into segmented sections in accordance with a temporal encoding scheme that encodes temporal information in the network map; and encoding the segmented sections using a performance encoding scheme that identifies a level of performance associated with the segmented sections, the partitioned and encoded graphical affordance being included in the network map and representing a performance of the network element over time.

9. The storage device of claim 8, wherein the operations further comprise specifying a length of the segmented sections to be proportional to a length of time for which the network performance information remains within a predefined range associated with the performance encoding scheme.

10. The storage device of claim 8, wherein the operations further comprise specifying a length of the segmented sections to be identical to indicate that each of the segmented sections represents an identical amount of time.

11. The storage device of claim 8, wherein the operations further comprise grouping the segmented sections according to performance identifiers associated with the segmented sections so that segmented sections having a common performance identifier are arranged adjacently to illustrate an amount of time for which the network device remains associated with the performance identifiers in a reported time period.

12. The storage device of claim 8, wherein the operations further comprise positioning the segmented sections according to a temporal distribution associated with the segmented sections so that the segmented sections are arranged adjacently in a sequential and consecutive manner relative to a time at which the performance information is calculated for each segmented section.

13. The storage device of claim 8, wherein the network element is the network link, and the operations further comprise representing the network link using two graphical affordances that graphically indicate bi-directional communication over the link and graphically indicate the performance level associated with each communication direction separately.

14. The storage device of claim 8, wherein the network element is a node device of the plurality of node devices, and the operations further comprise arranging the segmented sections of the graphical affordance that represents the network element in one of a column or a row.

15. A system for representing network performance information using a network map comprising:

a processing device; and a memory device to store instructions that, when executed using the processing device, perform operations comprising:

accessing a network map representing a network, the network comprising a plurality of network elements, the plurality of network elements comprising a plurality of node devices and at least one link between the plurality of node devices, the network map comprising a plurality of graphical affordances that graphically represent the plurality of network elements, wherein the plurality of node devices are represented by polygonal graphical affordances of the plurality of graphical affordances, the polygonal graphical affordances are positioned in a non-linear fashion in the network map relative to one another, and the network link is represented by a graphical affordance of the plurality of graphical affordances that extends between two of the polygonal graphical affordances that represent the respective first and second node devices;

partitioning a graphical affordance of the plurality of graphical affordances associated with a network element of the plurality of network elements into segmented sections in accordance with a temporal encoding scheme that encodes temporal information in the network map; and encoding the segmented sections using a performance encoding scheme that identifies a level of performance associated with the segmented sections, the partitioned and encoded graphical affordance being included in the network map and representing a performance of the network element over time.

16. The system of claim 15, wherein the operations further comprise specifying a length of the segmented sections to be proportional to a length of time for which the network performance information remains within a predefined range associated with the performance encoding scheme.

17. The system of claim 15, wherein a length of the segmented sections is identical to indicate that each of the segmented sections represents an identical amount of time.

18. The system of claim 15, wherein the operations further comprise grouping the segmented sections according to performance identifiers associated with the segmented sections so that segmented sections having a common performance identifier are arranged adjacently to illustrate an amount of time for which the network device remains associated with the performance identifiers in a reported time period.

19. The system of claim 15, wherein the operations further comprise positioning the segmented sections according to a temporal distribution associated with the segmented sections so that the segmented sections are arranged adjacently in a sequential and consecutive manner relative to a time at which the performance information is calculated for each segmented section.

20. The system of claim 15, wherein the network element is the network link, the network link being represented using two graphical affordances that graphically indicate bi-directional communication over the link and further graphically indicate the performance level associated with each communication direction separately.

* * * * *